United States Patent [19]

Urbanick

[11] 4,403,452
[45] Sep. 13, 1983

[54] HARDWARE ATTACHING MEANS FOR PANEL STRUCTURES

[75] Inventor: Burton A. Urbanick, LaGrange, Ill.

[73] Assignee: Met-L-Wood Corporation, Chicago, Ill.

[21] Appl. No.: 277,268

[22] Filed: Jun. 25, 1981

[51] Int. Cl.³ .............................................. E06B 3/00
[52] U.S. Cl. ...................................... 49/501; 49/381; 49/488
[58] Field of Search ................. 49/501, 381, 503, 488; 16/221, 382; 52/809

[56] References Cited

U.S. PATENT DOCUMENTS

| | | |
|---|---|---|
| 1,123,450 | 1/1915 | Wheeler . |
| 2,199,586 | 5/1940 | Bowser . |
| 2,655,685 | 10/1953 | Lewis . |
| 2,924,860 | 2/1960 | Parham, Jr. et al. .................. 49/501 |
| 2,936,050 | 5/1960 | McLaughlin . |
| 3,355,850 | 12/1967 | Rohe . |
| 3,886,686 | 6/1975 | Urbanick . |
| 4,015,368 | 4/1977 | Court et al. .......................... 49/488 |
| 4,118,827 | 10/1978 | Yamamoto ........................... 49/501 |
| 4,263,751 | 4/1981 | Bennett et al. ....................... 49/501 |

Primary Examiner—Philip C. Kannan
Attorney, Agent, or Firm—Hosier, Niro & Daleiden

[57] ABSTRACT

Hardware attaching means is disclosed in the form of a support assembly for attaching hardware to a panel structure. The assembly includes one or more doubler plates adhered to the exterior of the panel structure to distribute hanging and service forces thereto. Spacer means is provided in the assembly to prevent excessive compression and bearing stress of the panel structure when the assembly is held in supporting relationship therewith.

35 Claims, 4 Drawing Figures

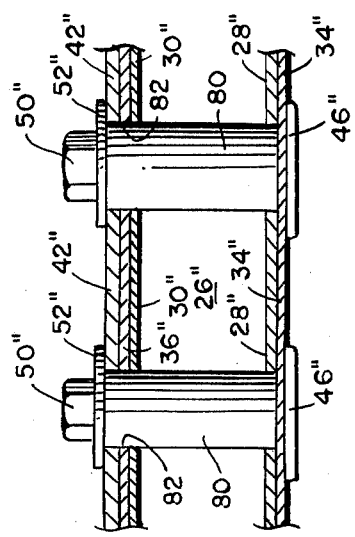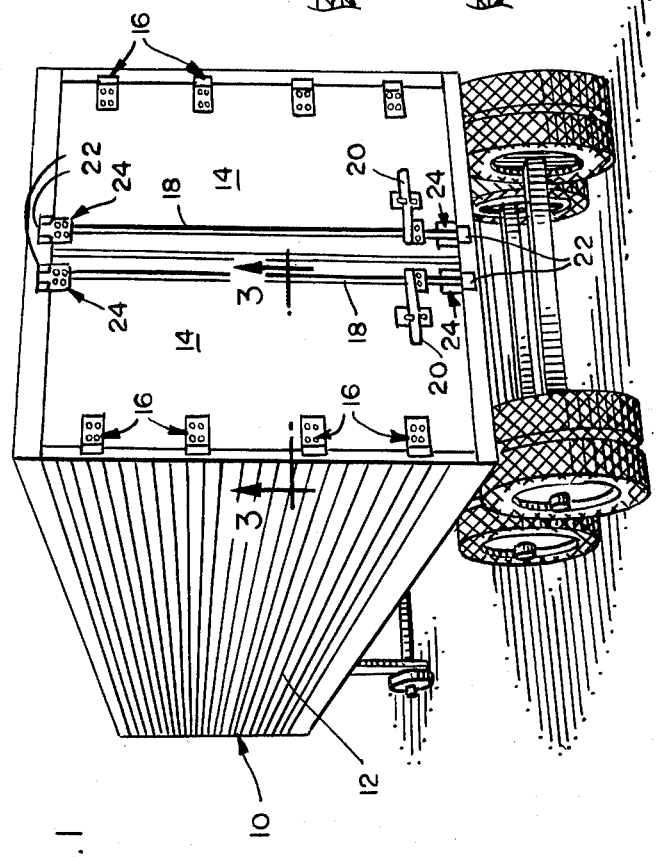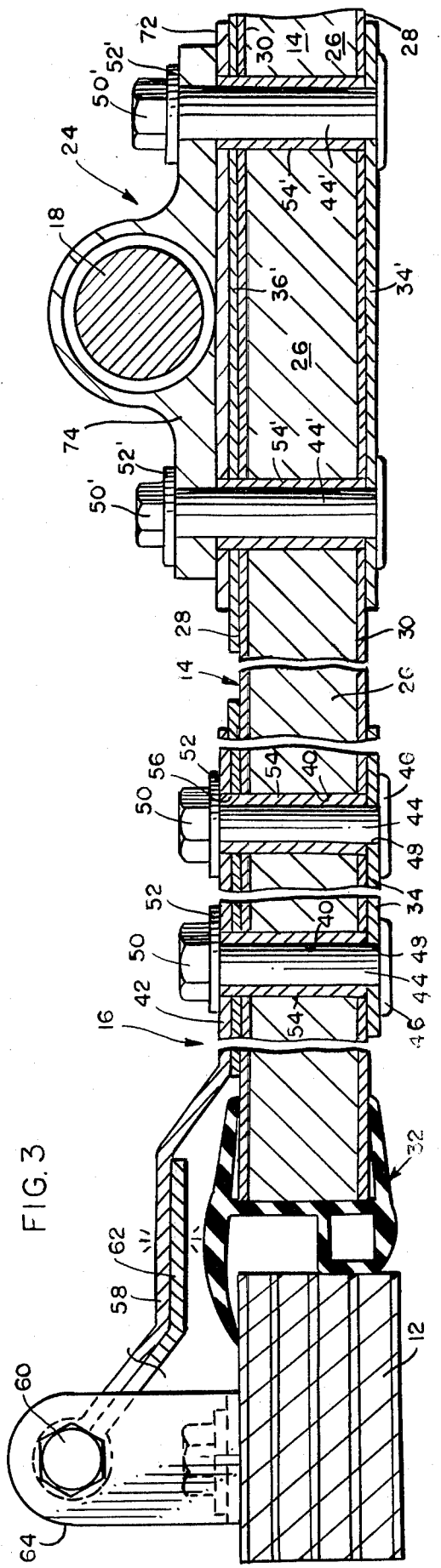

HARDWARE ATTACHING MEANS FOR PANEL STRUCTURES

BACKGROUND OF THE INVENTION

The present invention generally relates to support assemblies for panel structures, and particularly to mounting hardware therefor as used in semitrailer vans, truck bodies, cargo boxes, railway freight cars and the like.

The use of lightweight door panels has become increasingly prevalent in the transportation industry to reduce the weight of a vehicle while maintaining structural integrity. Accordingly, it is known to fabricate such door panels of a composite nature including a core material of rigid polystyrene, for example, to which metallic skins are adhesively bonded on each face of the core. Of course, other composite door panels are known such as those having a honeycomb interior which also provides for structural integrity. The skins provide resistance to deflection and resistance to moisture as they are structurally bonded to the core.

Although such door panel structures have received wide acceptability, problems have been encountered in the area of securely attaching hardware, such as hinges or the like, to the door panels. One problem concerns the possibility of excessive compression of the door panels which may be fabricated with somewhat compressible cores such as rigid polystyrene. Excessive compression may also damage such cores as those fabricated of honeycomb constructions.

Another problem concerns the distribution of the hanging forces from hardware to the door panel. Heretofore, it was simple enough to simply drill holes through a relatively rigid door panel, such as one of plywood construction, and attach the hardware by means of conventional bolts. However, with lightweight composite panel constructions as described above, repeated operation of the door panels can result in excessive wear in the area of the bolts which often results in play between the hardware and the door panels. This can cause misalignment of the doors.

The present invention is directed to a new and improved support assembly for attaching hardware to panel structures in order to solve the above and other problems resulting from the use of lightweight composite door panels.

SUMMARY OF THE INVENTION

An object, therefore, of the present invention is to provide a new and improved attaching means for mounting hardware to panel structures, and particularly to a support assembly for attaching the hardware to lightweight composite door panels, for instance.

In the exemplary embodiment of the invention, a support assembly is disclosed for attaching hardware to a panel structure having first and second exterior surfaces. A first doubler plate is disposed on one side of the panel structure in abutment with the first exterior surface. A second doubler plate is disposed on the opposite side of the panel structure in abutment with the second exterior surface thereof. A hardware member is engageable with the outside of the second doubler plate. The hardware member may comprise a plate portion of a hinge, for instance. Aperture means extends in alignment through the doubler plates, the panel structure and the hardware member. Fastening means in the form of a threaded bolt is engageable with the first doubler plate and extends through the aperture means through the hardware member. Spacer means in the form of a tubular ferrule member is fixed to the hardware member or plate and extends through the second doubler plate and the panel structure and into abutment with the first doubler plate to prevent excessive compression of the panel structure. Securing means in the form of a threaded nut is engageable with the threaded bolt on the outside of the hardware member to hold the support assembly in supporting relationship with the panel structure. Other conventional fasteners are also considered to engage the assembly.

In an alternate form of the invention, the spacer means or ferrule member is fixed to the second doubler plate and extends through the panel structure into abutment with the first doubler plate, again to prevent excessive compression of the panel structure.

Preferably, one or more of the doubler plates are adhered to the respective sides of the panel structure so as to be in integral relationship therewith and thereby distribute hanging forces thereto. In addition, the fastening means or bolt is fixed to the first doubler plate so as to be in integral relationship therewith. This is quite advantageous during assembly because more than one fastening and securing means (or bolt and nut assembly) normally are used with an item of hardware, such as a hinge.

As disclosed herein, the aperture means through the doubler plates for receiving the spacer means or ferrule member is dimensioned closely to the outside diameter of the ferrule member so that the panel structure effectively hangs by means of the doubler plates onto the spacing ferrule member extending through the plates and the panel structure.

Other objects, features and advantages of the invention will be apparent from the following detailed description taken in conjunction with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a rear perspective view of a semitrailer van with door panels incorporating the hardware attaching means of the present invention;

FIG. 3 is a fragmented horizontal sectional view through the support assembly of the present invention, incorporated in hinge and tie-rod hardware items, on an enlarged scale and taken generally along line 3—3 of FIG. 1;

FIG. 4 is a fragmented horizontal sectional view of a support assembly incorporating a modified form of spacer means.

DETAILED DESCRIPTION OF THE INVENTION

Figure 2:
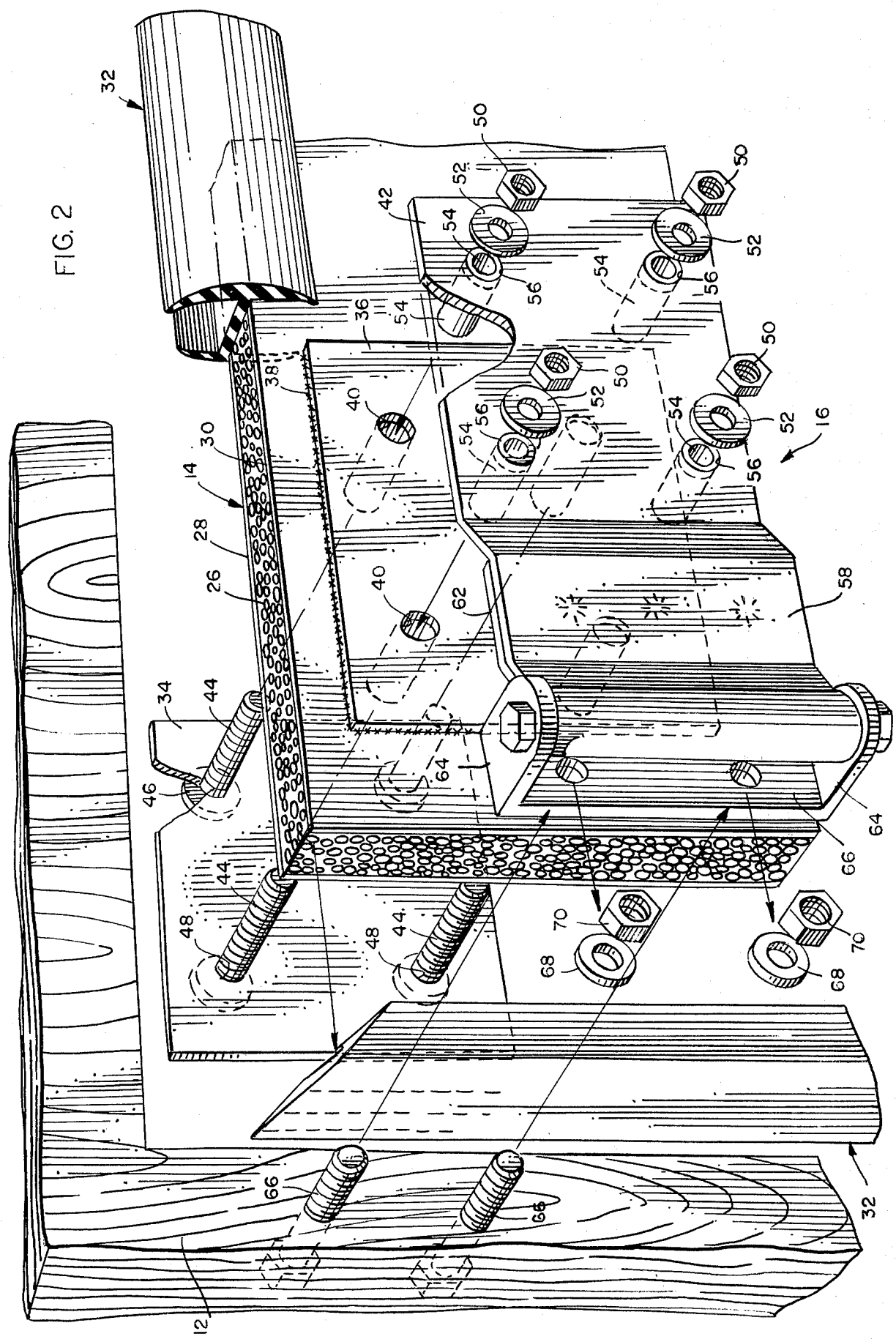
FIG. 2 is an exploded, partially fragmented, perspective view of a support assembly for attaching a hinge to a door panel, in accordance with the present invention.

Referring to the drawings in greater detail, and first to FIG. 1, a semitrailer van, generally designated 10, conventionally includes a cargo box 12 having rear door panels 14. Support assemblies, generally designated 16, in the form of hinges swingably support the door panels for opening and closing the same. Conventional locking-rods 18, having lock handles 20, are used in conjunction with locking means 22 above and below the door panels on the cargo box frame for locking the door panels in closed condition. Support assemblies, generally designated 24, are provided as bearing means on the door panels at the extremities of the locking-rods to transmit and accept forces therebetween. The present invention is concerned with new and improved support assemblies for attaching hardware, such as hinges 16 and bearing support assemblies 24, to panel structures such as door panels 14.

More particularly, and referring to FIGS. 2 and 3, door panels 14 may be composed of any suitable material known in the art, although the present invention is directed to lightweight door panels constructed of a composite structural laminate comprising a core 26 and skins 28 and 30 forming first and second exterior surfaces of the door panel. Core 26 may be fabricated of rigid polystyrene and skins 28, 30 may be fabricated of metal. Door closure seal means, generally designated 32, is provided about the periphery of door panels 14. Details of the closure seal means is shown in my U.S. Pat. No. 3,886,686, and assigned to the same assignee as the present invention.

In describing the details of the hinge support assemblies 16 of the present invention, reference is made particularly to FIG. 2 and the left-hand part of FIG. 3. More particularly, the support assembly is shown for attaching the hinge hardware to the door panel which has first and second exterior surfaces defined by metallic skins 28 and 30, respectively. A first, generally rectangular doubler plate 34 is disposed on one side of door panel 14 in abutment with skin 28. A second, generally rectangular doubler plate 36 is disposed on the opposite side of the door panel in abutment with skin 30. Either one or both of these doubler plates are bonded to the skins by adhesive 38 (FIG. 2) so as to be in integral relationship with the door panel and thereby distribute hanging forces thereto. Aperture means 40 extends in alignment through the doubler plates and the door panel. A hardware member in the form of a generally rectangular hinge plate 42 is engageable with the outside of second doubler plate 36.

Fastening means in the form of a threaded bolt 44 is engageable with first doubler plate 34 and extends through aperture means 40 and through hinge plate 42, as best seen in FIG. 3. The threaded bolt has a head portion 46 seated against the outside of first doubler plate 34. Preferably, the fastening bolt is fixed to the doubler plate so as to be in integral relationship therewith. This can be done by a press fit or swaging the bolt in an aperture 48 in the doubler plate, the aperture comprising an aligned extension of aperture means 40. Securing means in the form of threaded nuts 50 and washers 52 are engageable with the fastening bolts on the outside of hinge plate 42 to hold the entire support assembly in supporting relationship with door panel 14.

In order to prevent excessive commpression of door panel 14, spacer means in the form of tubular ferrule members 54 are fixed to hinge plate 42 and extend through second doubler plate 36 and door panel 14 and into abutment with first doubler plate 34. The spacing ferrules may be fixed to the hinge plate by a press fit or swaging within apertures 56 which form aligned extensions of aperture means 40.

The hinge support assembly 16 is pivotally mounted to cargo box 12 by means of an offset extension 58 of hinge plate 42. The extension is wrapped about a pivot rod 60 and back onto itself, as at 62, to provide a pivotal mounting for the door panel. The pivot rod extends between a pair of ears 64 of a hinge or butt bracket 66 which is secured to the cargo box by means of bolts 66, washers 68 and nuts 70 or by welding.

Referring to the right-hand part of FIG. 3, the lock-rod support assembly 24 is mounted to door panel 14 similar to hinge support assembly 16. More particularly, hinge plate 42 is replaced by a hardware plate 72 which has a bearing portion 74 fixed thereto for receiving lock-rod 18. Hardware plate 72 is engageable with a doubler plate 36' corresponding to second doubler plate 36. Without unduly belaboring the disclosure, lock-rod support assembly for mounting the hardware thereof to door panel 14 is substantially identical to hinge support assembly 16, and like primed numerals have been applied corresponding to like components of the hinge assembly both structurally and functionally.

Referring to FIG. 4, a support assembly is shown to include an alternate form of spacer means and, again, like double-primed numerals have been applied to like elements of hinge support assembly 16. More particularly, in this embodiment, tubular ferrule spacing members 80 are fixed to second doubler plate 36" by means of a press fit or swaging within apertures 82 in the doubler plate. The tubular ferrule members protrude outwardly beyond the doubler plate approximately the thickness of hinge plate 42". Here again, the ferrule member is in abutment with first doubler plate 34" to prevent excessive compression of door panel 14. Again, one or both doubler plates 34" and 36" are adhered to the respective sides of door panel 14 so as to be in integral relationship therewith and thereby distribute service forces or stress thereto.

In all of the embodiments of the support assemblies shown herein, spacer means 54, 54' and 80 preferably are of a length extending through the door panel slightly less than the thickness thereof to provide a marginal compression of the lightweight panel construction and insure intimate mechanical engagement.

It will be understood that the invention may be embodied in other specific forms without departing from the spirit or central characteristics thereof. The present examples and embodiments, therefor, are to be considered in all respects as illustrative and not restrictive, and the invention is not to be limited to the details given herein.

What is claimed is:

1. A support assembly for attaching hardware to a panel structure having first and second exterior surfaces, comprising in combination:
   a first doubler plate on one side of said panel structure in abutment with said first exterior surface;
   a second doubler plate on the opposite side of said panel structure in abutment with said second exterior surface;
   a hardware member engageable with the outside of said second doubler plate;
   aperture means extending in alignment through said doubler plates, said panel structure and said hardware member;

fastening means engaging said first doubler plate and extending through said aperture means through said hardware member;

spacer means fixed to said hardware member and extending through said second doubler plate and said panel structure and into abutment with said first doubler plate to prevent excessive compression of said panel structure; and securing means engageable with said fastening means on the outside of said hardware member to hold said support assembly in supporting relationship with said panel structure.

2. The support assembly of claim 1 wherein said spacer means extends through said aperture means about said fastening means.

3. The support assembly of claim 1 wherein said fastening means is fixed to said first doubler plate so as to be in integral relationship therewith.

4. The support assembly of claim 1 wherein said panel structure is of a lightweight construction and said spacer means is of a length extending through the panel structure slightly less than the thickness thereof.

5. The support assembly of claim 1 wherein said second doubler plate is adhered to said opposite side of the panel structure so as to be in integral relationship therewith and thereby distribute forces thereto.

6. The support assembly of claim 1 wherein both said doubler plates are adhered to the respective sides of said panel structure so as to be in integral relationship therewith and thereby distribute forces thereto.

7. The support assembly of claim 1 wherein said fastening means comprises an elongated member, and said spacer means comprises a tubular ferrule member extending through said aperture means about said elongated member.

8. The support assembly of claim 7 wherein said fastening means is fixed to said first doubler plate so as to be in integral relationship therewith.

9. The support assembly of claim 1 wherein said fastening means comprises a threaded bolt extending through said aperture means.

10. The support assembly of claim 9 wherein said bolt has a head portion fixed to said first doubler plate in integral relationship therewith.

11. The support assembly of claim 9 wherein said securing means comprises a nut threadable onto the end of said bolt against the outside of said hardware member.

12. The support assembly of claim 11 wherein spacer means comprises a tubular ferrule member extending through said aperture means about said bolt.

13. The support assembly of claim 12 wherein said tubular ferrule member is fixed to said hardware member by a press fit into a complementary hole in the hardware member so as to be in integral relationship therewith.

14. A support assembly for attaching hardware to a panel structure having first and second exterior surfaces, comprising in combination:
a first doubler plate on one side of said panel structure in abutment with said first exterior surface;
a second doubler plate adhered to the opposite side of said panel structure in abutment with said second exterior surface;
a hardware plate engageable with the outside of said second doubler plate;
aperture means extending in alignment through said doubler plates, said panel structure and said hardware plate;
elongated fastening means fixed at one end to said first doubler plate and extending through said aperture means, with the opposite end of the fastening means exposed on the outside of said hardware plate;
spacer means in the form of a tubular ferrule member fixed at one end to said hardware plate and extending through said aperture means about said elongated fastening means and into abutment with said first doubler plate to prevent compression of said panel structure; and
securing means engageable with said other end of said fastening means on the outside of said hardware plate to hold said support assembly in supporting relationship with said panel structure.

15. The support assembly of claim 14 wherein said fastening means comprises a threaded bolt extending through said aperture means, and said securing means comprises a nut threadable onto said bolt against the outside of said hardware plate.

16. The support assembly of claim 14 wherein said tubular ferrule member is fixed to said hardware plate by a press fit into a complementary hole in the hardware plate so as to be in integral relationship therewith.

17. The support assembly of claim 14 wherein said first doubler plate is bonded to said one side of said panel structure so as to be in integral relationship therewith.

18. A support assembly for attaching hardware to a panel structure having first and second exterior surfaces, comprising in combination:
a support plate member on one side of said panel structure in abutment with said first exterior surface;
a hardware plate member on the opposite side of said panel structure;
aperture means extending in alignment through said plate members and said panel structure;
spacer means fixed to one of said plate members and extending through said aperture means into abutment with the other of said plate members to prevent compression of said panel structure; and
fastening and securing means extending through said aperture means and in engagement with said plate members to hold said support assembly in supporting relationship with said panel structure.

19. The support assembly of claim 18 wherein said spacer means is fixed to one of said plate members so as to be in integral relationship therewith and in abutment with the other of said plate members.

20. The support assembly of claim 18 wherein said fastening means comprises an elongated member extending through said aperture means, and said spacer means comprises a tubular ferrule member extending through said aperture means about said fastening means.

21. The support assembly of claim 18 wherein said support plate member is bonded to said first exterior surface of said panel structure so as to be in integral relationship therewith and thereby distribute forces thereto.

22. The support assembly of claim 21 wherein said spacer means is fixed to said hardware plate member so as to be in integral relationship therewith and in abutment with said support plate member.

23. A support assembly for attaching hardware to a panel structure having first and second exterior surfaces, comprising in combination:
- a first doubler plate on one side of said panel structure in abutment with said first exterior surface;
- a second doubler plate on the opposite side of said panel structure in abutment with said second exterior surface;
- a hardware member engageable with the outside of said second doubler plate;
- aperture means extending in alignment through said doubler plates, said panel structure and said hardware member;
- fastening means engaging said first doubler plate and extending through said aperture means through said hardware member;
- spacer means fixed to said second doubler plate and extending through said panel structure and into abutment with said first doubler plate to prevent compression of said panel structure; and
- securing means engageable with said fastening means on the outside of said hardware member to hold said support assembly in supporting relationship with said panel structure.

24. The support assembly of claim 23 wherein said spacer means extends through said aperture means about said fastening means.

25. The support assembly of claim 23 wherein said fastening means is fixed to said first doubler plate so as to be in integral relationship therewith.

26. The support assembly of claim 23 wherein said panel structure is of a lightweight construction and said spacer means is of a length extending through the panel structure slightly less than the thickness thereof.

27. The support assembly of claim 23 wherein said second doubler plate is bonded to said opposite side of the panel structure so as to be in integral relationship therewith and thereby distribute forces thereto.

28. The support assembly of claim 23 wherein both said doubler plates are bonded to the respective sides of said panel structure so as to be in integral relationship therewith and thereby distribute forces thereto.

29. The support assembly of claim 23 wherein said fastening means comprises an elongated member, and said spacer means comprises a tubular ferrule member exteding through said aperture means about said elongated member.

30. The support assembly of claim 29 wherein said tubular ferrule member extends beyond the outside of said second doubler plate through the aperture means in said hardware member at least but not more than the thickness thereof.

31. The support assembly of claim 23 wherein said fastening means comprises a threaded bolt extending through said aperture means.

32. The support assembly of claim 31 wherein said bolt has a head portion fixed to said first doubler plate in integral relationship therewith.

33. The support assembly of claim 31 wherein said securing means comprises a nut threadable onto the end of said bolt against the outside of said hardware member.

34. The support assembly of claim 33 wherein spacer means comprises a tubular ferrule member extending through said aperture means about said bolt.

35. The support assembly of claim 34 wherein said tubular ferrule member is fixed to said second doubler plate by a press fit into a complementary hole in the doubler plate so as to be in integral relationship therewith.

* * * * *